Patented Aug. 16, 1938

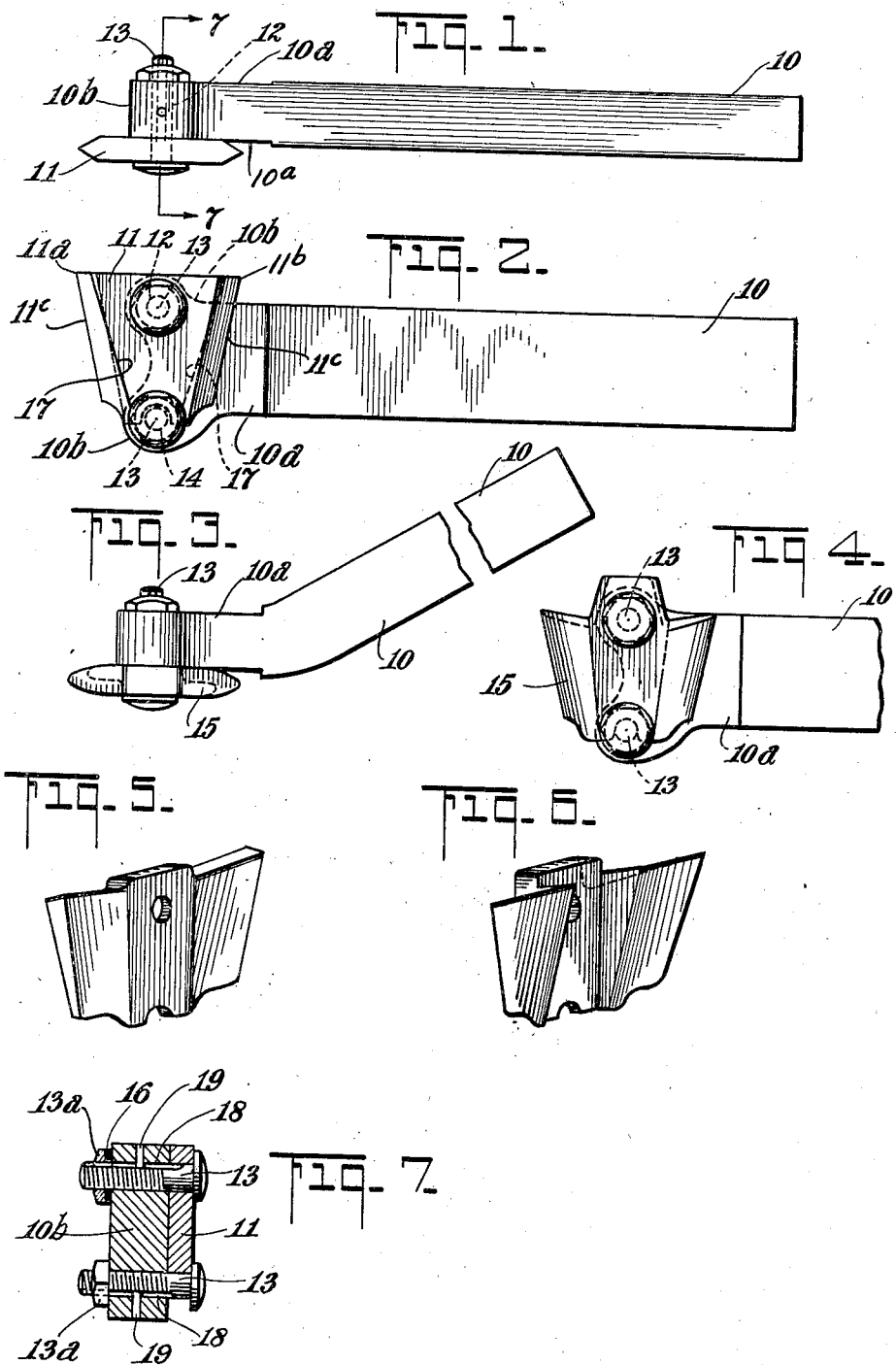
Aug. 16, 1938. H. MORRIS 2,127,231
TOOL HOLDER AND TOOL
Filed Sept. 25, 1936
INVENTOR.
HARRY MORRIS
BY
ATTORNEY.

2,127,231

UNITED STATES PATENT OFFICE 2,127,231

TOOL HOLDER AND TOOL

Harry Morris, Brooklyn, N. Y.

Application September 25, 1936, Serial No. 102,449

4 Claims. (Cl. 29—96)

This invention relates to tool holders and tools, and more particularly to an improved form of cutting tool and tool holder. The use of the improved tool holder and tool of the present invention in metal turning and forming permits a substantial reduction in the number and size of tools necessary to meet all working conditions and makes possible a more efficient use of the cutting tools.

Tools have been proposed heretofore in which a cutting tool is detachably mounted in a tool holder. Many disadvantages have been encountered in such tools as heretofore proposed. For example, a separate cutting tool having but a single cutting edge has been required for each operation to be performed. Furthermore, the cutting tool could be used only for a limited period determined by the number of times which the tool had been reground. As the cutting edge of the tool became ground to a position substantially below its original horizontal position, the tool became useless due to the fact that the cutting surface would not engage the material being worked in the proper horizontal position.

These and the many other inherent disadvantages in such tools have been completely eliminated by the present invention. One of the salient advantages of the lathe tool of my invention is that it is reversible. Not only may either one of two cutting edges of a single cutting tool be used at will and the cutting tool mounted on either side of the tool holder, but the horizontal position of the cutting edge of the cutting tool may be altered at will.

The novel tool of my invention comprises a cutting member, a holding member, and means adapted to hold the cutting member adjacent one end of the holding member. The end of the holding member to which the cutting tool is attached is so reduced in cross-section that the reduced end portion is substantially weaker than the cutting member. The details of the tool of my invention will be more readily understood by consideration of the acompanying drawing in which—

Fig. 1 is a top or plan view of one proposed form of tool holder with a threading tool attached thereto;

Fig. 2 is a side view of the lathe tool shown in Fig. 1;

Fig. 3 is a top or plan view of a modified form of tool holder with a roughing or surfacing tool attached thereto;

Fig. 4 is a side view of the lathe tool shown in Fig. 3;

Fig. 5 is a perspective view of a cutting-off tool adapted to be used with the tool holder of this invention;

Fig. 6 is a perspective view of a side cutting tool adapted to be used with the tool holder of this invention; and Fig. 7 is a cross-sectional view taken through the line 7—7 of the lathe tool shown in Fig. 1.

The lathe tool shown in Figs. 1 and 2 comprises a tool holding member or stock 10 adapted to be held by a standard form of tool post. One end of the stock is reduced in cross-section to form the flat surfaces 10a terminating at the top and bottom of the stock in lugs 10b. The cross-section of the reduced end portion is so gauged that it is substantially weaker than the cutting tool. The lower lug, as shown in Fig. 2, extends further beyond the bottom of the tool holder than the upper lug extends beyond the top of the tool holder. Thus, the centers of the holes 12 and 14 drilled through the upper and lower lugs, respectively, are located at unequal distances from the longitudinal axis of the tool holder. The wide spread between the holes in the lugs assists in carrying all strains on the cutting tool with a wide margin of safety.

The thread cutting tool as shown in Fig. 2, comprises a body portion 11 terminating at the sides in two blades 11c having cutting edges 11a and 11b. The cutting tool is provided with a hole extending transversely through the body portion 11 adjacent the upper portion thereof intermediate the two blades. The lower portion of the cutting tool is also provided with means intermediate the two blades adapted to engage a bolt and this means may comprise a hole through the body of the tool or a slot extending upwardly from the lower edge of the cutting tool as shown in Figs. 2, 4, 5, and 6.

The cutting tool 11 is securely attached to one of the flat surfaces 10a by bolts 13 extending through the holes in the lugs 10b and through the body portion of the cutting tool. The bolts 13 are provided with nuts 13a (Fig. 7) having an annular recess cut into the inner face or engaging surface of the nuts. A collar 16 consisting of a relatively soft metal such, for example, as copper or brass is partially embedded in this annular recess. The portion of the collar 16 extending outwardly beyond the inner face of the nuts securely engages the flat surface 10a of the relatively hard metal stock 10, and the friction thus provided between the relatively hard and relatively soft metals prevents the nuts from loosening by the vibration to which the tool is subjected when in use. The bolts 13 are provided with longitudinal slots 18 extending from the threaded end of the bolt along substantially the entire length of the bolt. Pins 19 are inserted in holes drilled into the lugs 10b and extend a substantial distance within the holes 12 and 14 of the lugs substantially perpendicular to the axes of holes 12 and 14 so as to engage the longitudinal slots 18 in the bolts. The pin 19 engaging the slot 18 prevents turning of the bolt when a nut is being tightened thereon, thus eliminating the necessity of using a broached hole or similar device to prevent turning of the bolt.

It will be apparent, therefore, that the tool of my invention comprises a cutting tool securely attached to a tool holder, thus producing a tool of desirably high rigidity. In spite of the rigidity of the tool assembly, the reduced end portion of the tool holder permits the toolholder to be fractured rather than the relatively expensive cutting tool in the event that an extremely severe strain be put upon the tool.

The modified form of tool holder shown in Fig. 3 is similar to the tool holder shown in Fig. 1 but is bent adjacent the reduced end portion of the holder to adapt the tool for work requiring such a shape. The modified form of tool 15 shown in Figs. 3 and 4 is one both cutting surfaces of which are adapted for roughing a piece of work done in the lathe. The cutting tools shown in Figs. 5 and 6 are adapted to be used with the lathe tool of this invention for the purposes of cutting-off and facing the ends of, respectively, the work being turned.

While the cutting tools shown in Figs. 1 through 6 are shown to have the same type of cutting edge at both ends, it will be readily apparent that one edge may be designed, for example, to be used for threading as in Fig. 1 while the other may be adapted for roughing as in Fig. 3. The cutting edge of the thread cutting tool, as shown, for example, by the ground side surfaces 17 of the tool 11, is so ground as to provide the blade of the cutting tool with a cant so as to insure clearance between the tool and the work at all portions of the blade except directly at the cutting edge. The cant of the blade may be chosen to correspond with the lead of the thread to be cut, but the cant is preferably increased to permit clearance over a wide range of thread pitches.

When a comparatively unused cutting tool is attached to the tool stock, the tool may be mounted upon either side of the reduced end portion of the stock with the lug furthest from the longitudinal axis of the tool holder being positioned at the bottom of the cutting tool. As the cutting edge is ground down for sharpening during use, the tool stock may be turned over with respect to the cutting tool so that the lug with the hole 14 is adjacent the top of the cutting tool. By thus reversing the tool stock, the cutting edge of the cutting tool may be raised vertically for a substantial distance in order to bring it up to the desired horizontal position. In this way a single cutting edge may be used with advantage until substantially all of the cutting edge has been ground away. The tool is further reversible in that either of the two cutting edges of the single cutting tool may be used by merely detaching the cutting tool from the stock and reversing it before again attaching the cutting tool to the stock so that the second cutting edge is presented to the work. Moreover, the two flat surfaces 10a of the reduced end portion of the tool holder permit complete adaptability of the lathe tool to all working conditions for the reason that a cutting tool may be attached to either side of the tool holder adjacent the reduced end portion thereof. It will be readily apparent, therefore, that inasmuch as the cutting tool may be mounted on either side of the tool holder, the cutting tool may be mounted in that position which is most convenient and which renders the lathe tool best adapted to cut in any required direction, whether to the left or to the right.

With the proposed structure of the cutting tool having a bolt hole adjacent its upper portion and a slot adjacent its lower portion, the cutting tool may be readily changed by withdrawing the upper bolt from the cutting tool and merely loosening the lower bolt sufficiently to permit the removal of the cutting tool. In spite of the fact that the cutting tool is securely attached to the tool holder and is readily accessible for changing, the tool of my invention does not present any portion thereof which will obscure the visibility of the operator as the cutting operation proceeds. The ease, therefore, with which the cutting tool may be attached to or detached from the tool holder, the reversibility of the cutting tool and tool holder, and the unobscured visibility of the cutting edge of the tool characterize the tool of my invention as one of extreme simplicity, safety and versatility.

Having now described the invention, what is claimed as new and for which Letters Patent of the United States is desired, is:

1. A metal cutting tool which comprises a holding member, a cutting member, bolts projecting through the cutting member and the holding member, and each of the bolts being provided with a nut having partially embedded in the inner face thereof a metal having a different degree of hardness than the surface with which the inner face of the nut is in contact, said metal remaining out of contact with the threads of said bolt.

2. A metal cutting tool which comprises a holding member, a cutting member, bolts projecting through the cutting member and the holding member, and each of the bolts being provided with a nut having partially embedded in the inner face thereof a collar consisting of a metal substantially softer than the surface of the holding member with which the inner face of the nut is in contact, said collar remaining out of contact with the threads of said bolt.

3. A metal cutting tool which comprises a holding member having a flat surface at one end thereof, a thread cutting member held adjacent one of the flat surfaces of the holding member, the thread cutting member being provided with a V-shaped blade such that the edge of the blade comprising the apex of the V is disposed at a cant to the vertical when the blade is disposed in a vertical position, bolts projecting through the cutting member and the holding member, and each of the bolts being provided with a nut having partially embedded in the inner face thereof a metal having a different degree of hardness than the surface with which the inner face of the nut is in contact, said metal remaining out of contact with the threads of said bolt.

4. A metal cutting tool which comprises a holding member having a flat surface at one end thereof, a thread cutting member held adjacent the flat surface of the holding member, the cutting member being provided with a V-shaped blade such that the edge of the blade comprising the apex of the V is disposed at a cant to the vertical when the blade is disposed in a vertical position, and means adapted to hold the cutting member adjacent one end of the holding member.

HARRY MORRIS.